United States Patent [19]

O'Hara

[11] Patent Number: 5,367,778
[45] Date of Patent: Nov. 29, 1994

[54] TANDEM AXLE ALIGNMENT DEVICE

[75] Inventor: Douglas J. O'Hara, Chatham, Canada

[73] Assignee: Navistar International Transportation Corp., Chicago, Ill.

[21] Appl. No.: 20,495

[22] Filed: Feb. 22, 1993

[51] Int. Cl.⁵ .......................... G01B 5/25; G01B 11/27
[52] U.S. Cl. .......................................... 33/193; 33/608;
33/645; 33/288; 33/DIG. 21
[58] Field of Search ............ 33/193, 203, 288, 203.18,
33/203.15, 600, 608, 645, 575, DIG. 21;
29/281.5, 281.6

[56] References Cited

U.S. PATENT DOCUMENTS

| | | | |
|---|---|---|---|
| 2,619,731 | 12/1952 | Zenz | 33/193 |
| 3,137,076 | 6/1964 | Hurst | 33/193 |
| 3,962,796 | 6/1976 | Johnston | 33/DIG. 21 |
| 4,055,899 | 11/1977 | Dean | 33/193 |
| 4,800,651 | 1/1989 | Hanlon | 33/203.18 |
| 5,157,838 | 10/1992 | Sims | 33/203.18 |

Primary Examiner—Alvin Wirthlin
Attorney, Agent, or Firm—Dennis K. Sullivan

[57] ABSTRACT

A device for engaging a vehicle chassis has mounted thereon a pair of tandem axles to be aligned perpendicular to frame rails of the chassis and parallel to one another, the device creating the alignments and having first and second spaced apart pairs of laterally spaced towers for engaging the ends of both tandem axles in a manner to maintain them parallel to one another, structure for supporting a rear end of the chassis in fixed position; and structure for moving the front end of the chassis to a predetermined position relative to the towers and being laser directed to position the chassis perpendicular to at least one of the axles.

21 Claims, 5 Drawing Sheets

FIG. 5
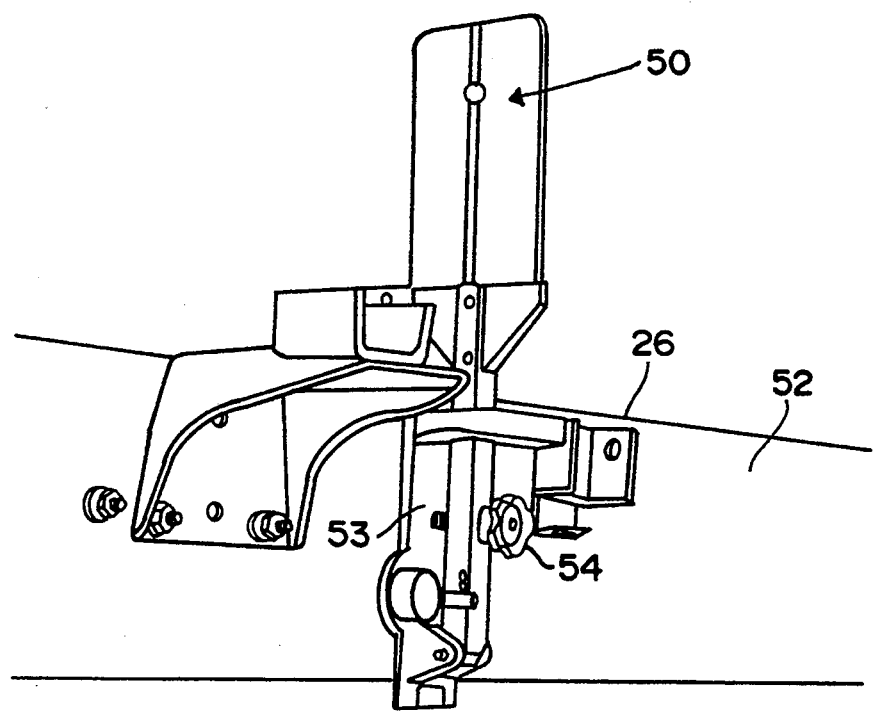
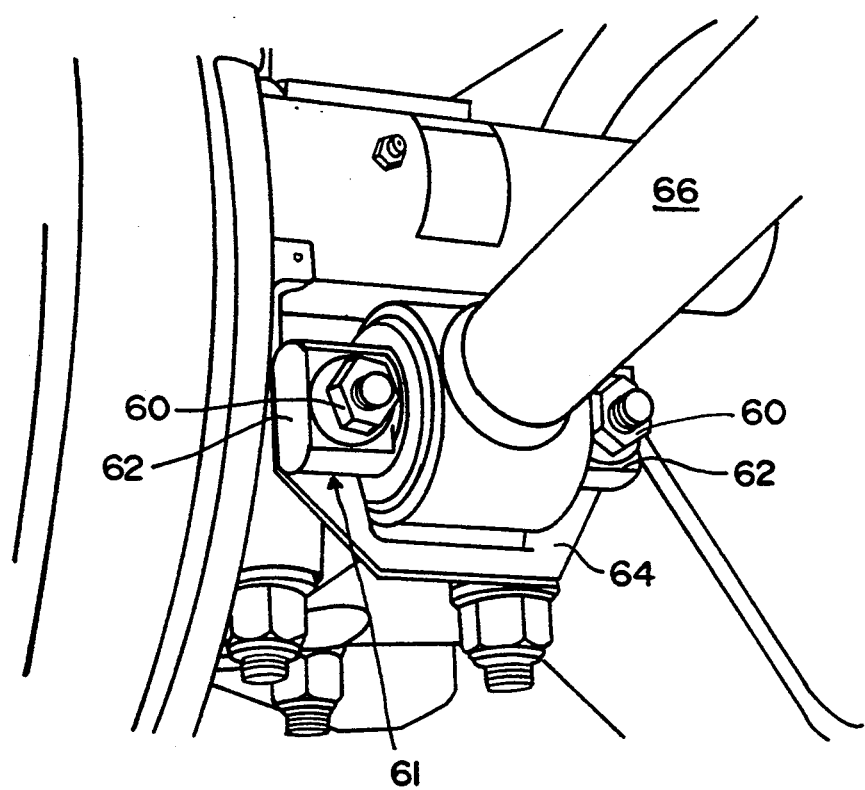
FIG. 6

TANDEM AXLE ALIGNMENT DEVICE

BACKGROUND OF THE INVENTION

The present invention relates to a device for accurately positioning the dual rear axles of a vehicle perpendicular to a frame thereof and parallel to one another on the assembly line, prior to installation of the wheels and tires, as part of the chassis building process when soft suspension systems are provided. More specifically, the system includes a laser directed, frame centering, axle positioning device.

THE PRIOR ART

Heretofore various alignment systems for use in aligning the axles with respect to the frame of a vehicle have been proposed.

For example, the Hanlon U.S. Pat. No. 4,800,651 discloses a vehicle alignment system comprised of two main components. The first component comprises a reference bar assembly which provides a reference relating to the orientation of the frame members by providing a reference line extending from the frame members and perpendicular thereto from which measurements may be taken to the perpendicular line. The second major component comprises a wheel assembly adapted to be mounted to the rim of a vehicle wheel providing an extension of the outer edge of the wheel rim and has means for allowing extension of the centerline of the axle having the wheel to which the wheel assembly is mounted. Alignment of the axles with respect to the frame members is determined by measuring from a fixed point on the reference bar assembly to the centerline of the axles on one side and taking a corresponding measurement on the opposite side of the frame members from the reference bar assembly to the centerline of the axles. A comparison of the measurements yields a determination of perpendicularity of the axle to the frame members.

Further, the Sims U.S. Pat. No. 5,157,838 discloses a vehicle axle alignment instrument and method. In the method one instrument is required to establish location points on the reference surface supporting the vehicle. A computer uses distances between location points to determine the relative position between axles and displays axle geometry on a monitor. Adjustments in the axle positions are provided based on the type of vehicle suspension system. This method and instrument are used in aftermarket alignments, the instrument being wheel mounted, and used to align tractor and trailer axles with a vehicle sitting on a planar horizontal surface.

It will be seen that such processes are time consuming and complicated. Further, numerous individual structures are manipulated to determine when alignment is achieved. Inasmuch as built-in tolerances exist in the equipment and there is inherent variability in the process, these processes are inadequate for present day required alignment specifications.

As will be described in greater detail hereinafter, the device of the present invention eliminates virtually all of the previous process variability and equipment tolerance stack-up, providing more precise control to achieve a more accurate alignment than ever possible before. Further, cost prohibitive equipment set-up time is eliminated. Also, the device provides more convenient access for frame component tightening, providing better control to torque sensitive fastening operations.

The device is more stable and sturdier than previous alignment equipment, promoting lower maintenance costs and improved productivity by significantly decreasing the time element involved in producing the required alignment.

SUMMARY OF THE INVENTION

Accordingly it is a primary object of the present invention to provide an axle alignment device which generates an extremely precise required alignment of tandem axles with each other and with the vehicle frame.

It is a further object to provide a device which provides alignment free of process variability and equipment tolerances.

It is yet a further object to provide a device having a minimal number of components to eliminate cost prohibitive equipment set up time.

It is yet a further object of the invention to provide lower maintenance costs and increased productivity by significantly decreasing processing time.

It is yet a further object of the invention to provide a system for use on the assembly line during the chassis building process and prior to installing wheels and tires onto the vehicle chassis.

These and other objects are met by the tandem axle alignment device of the present invention which comprises a support framework incorporating laser technology for directed positioning of the frame square to the forward, rear axle of the vehicle chassis and directed positioning of the rear rear axle parallel to the forward rear axle while the components are assembled loosely, in a relaxed position thereof, with tightening of all critical components being accomplished while the vehicle assembly is mounted in the device. The device allows for a simplified method for creating the alignment as well.

BRIEF DESCRIPTION OF THE DRAWINGS

FIG. 5 is an enlarged perspective view of a front axle centerline alignment target shown engaged to one side of one vehicle frame rail.

FIG. 6 is an enlarged perspective view of a portion of a tandem axle assembly of a vehicle including a forward, rear axle assembly showing where a shim may be inserted to obtain required alignment.

DESCRIPTION OF THE PREFERRED EMBODIMENT

Figure 1:
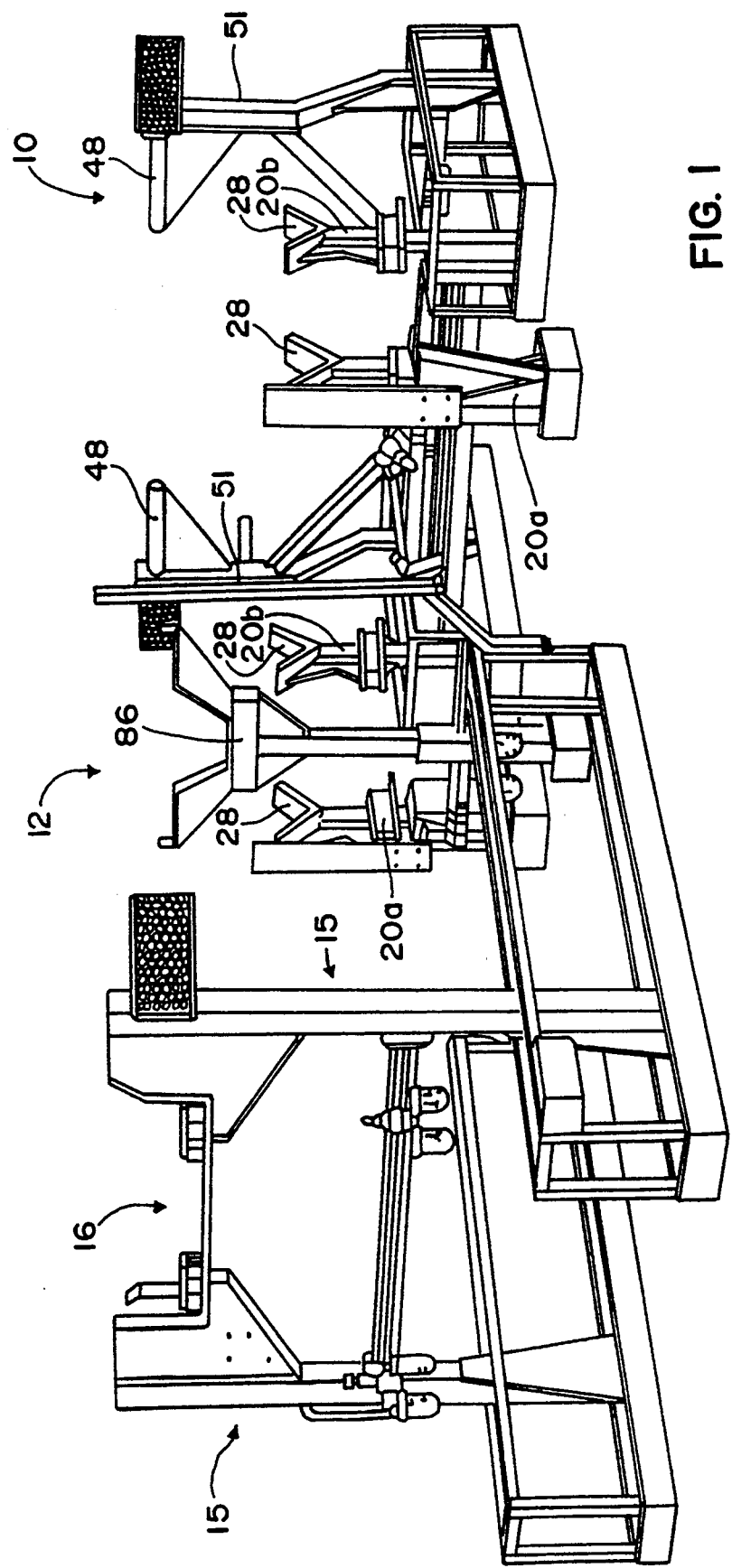
FIG. 1 is a perspective view of the tandem axle alignment device of the present invention.

Referring now to the drawings in greater detail, there is illustrated therein the tandem axle alignment device made in accordance with the teachings of the present invention and generally identified by the reference numeral 10.

Figure 2:
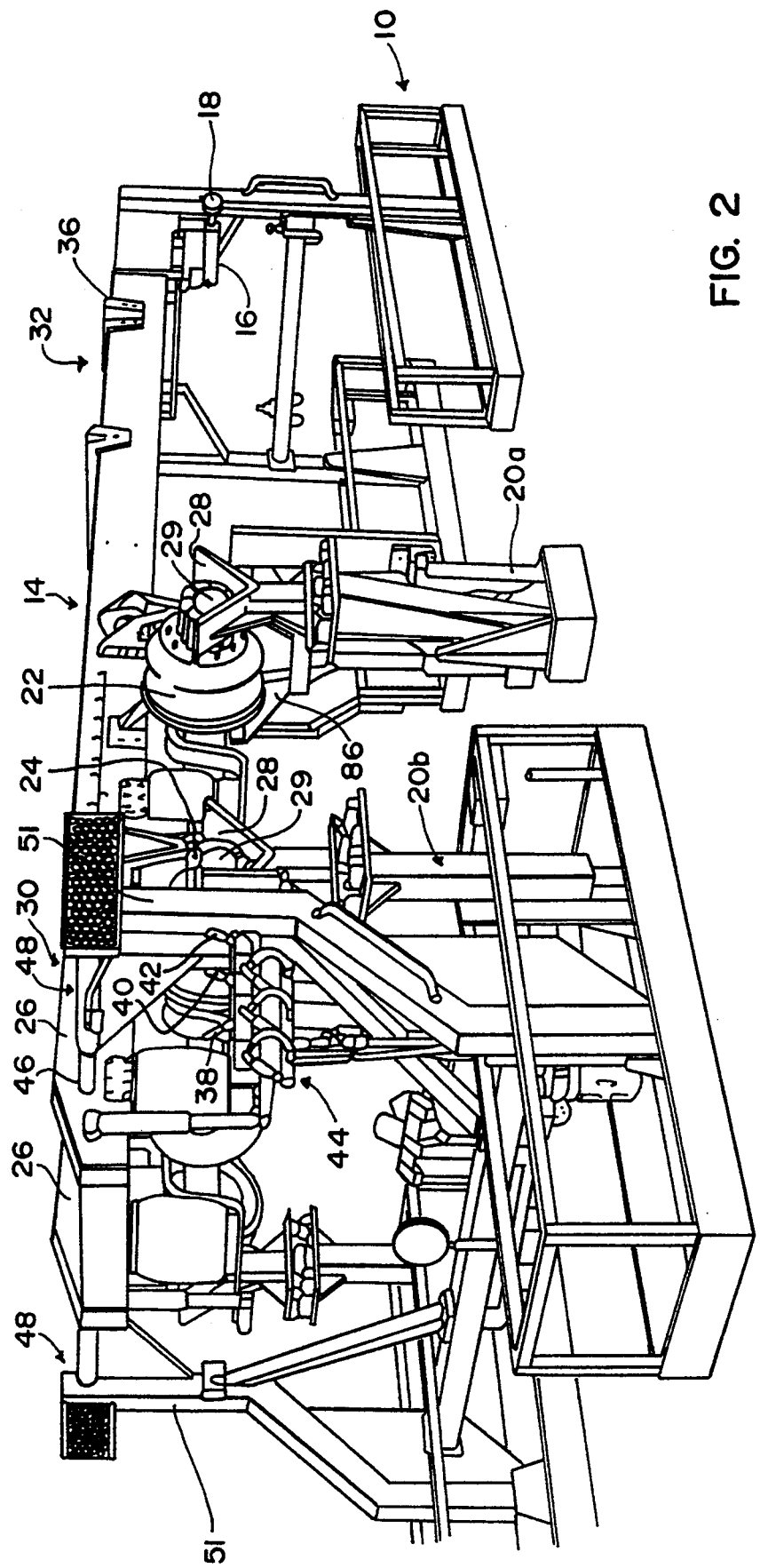
FIG. 2 is a perspective view of the device showing a chassis mounted thereon for alignment of the tandem axles thereof.
Figure 3:
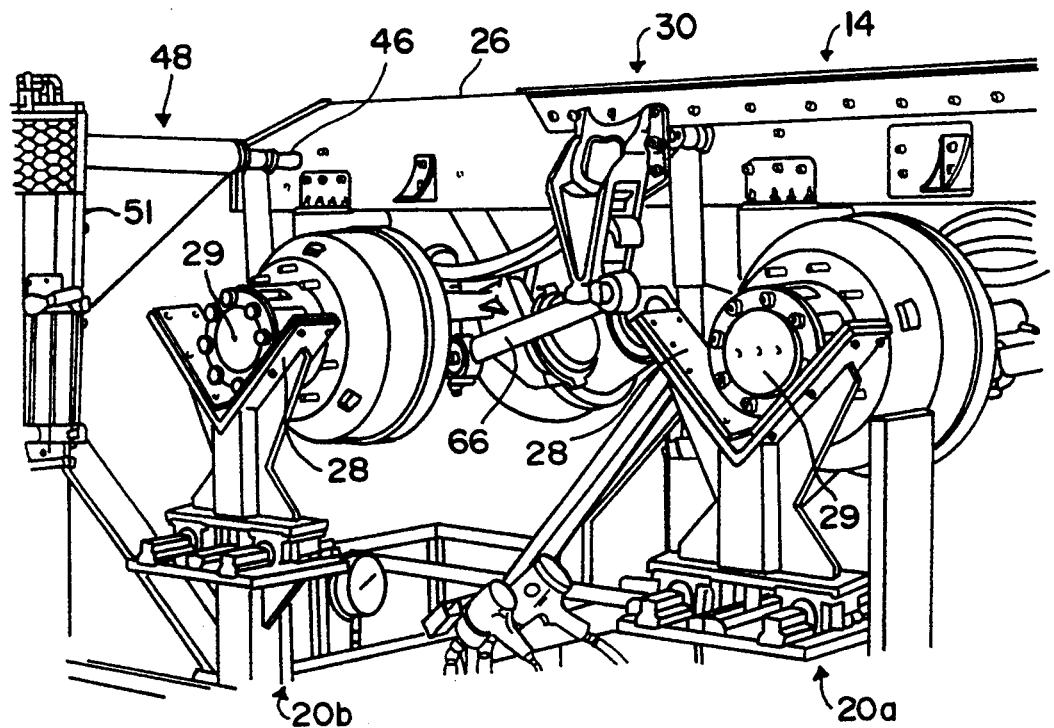
FIG. 3 is an enlarged perspective view of the rear tandem axle assemblies of the chassis sitting in support and alignment towers provided in the device.

As shown in FIGS. 1 and 2, which are shown from reverse perspective, the device 10 includes a multicomponent framework 12 upon which a vehicle chassis 14 may be brought to rest. The framework 12 includes two front end frame towers 15 which are structurally connected to one another, the right tower including a clamping assembly 16, the position of which may be adjusted by operation of a hand wheel 18, as will be described in greater detail hereinafter. The left tower 15 includes a low pressure air assist cylinder (not shown) for urging the vehicle frame against the right tower clamping assembly 16.

The framework 12 further includes two pairs, one on each side of the vehicle, of cooperating lateral towers 20a and 20b for supporting respectively a forward rear axle 22 and a rear rear axle 24 of a tandem axle assembly. It will be understood that the framework 12 is typically mounted within a pit extending below ground level so that the vehicle chassis 14 is at approximately eye level for ease in accessing areas thereof to be worked on, providing better torque control for sensitive component fastening operations.

The device 10 uses a beam of laser light for directing a required alignment configuration of the vehicle chassis 14. Such beam of laser light will originate from a point exterior of the framework 12, with the location of the source being predetermined relative to the framework 12. Typically such source is mounted to a wall or column (not shown) in the building within which the device 10 is located. The beam of laser light, as will be described in greater detail hereinafter, is used to position lateral frame rails 26 of the vehicle chassis 14 square to the forward rear axle 22 and the rear rear axle 24. The V-towers 20a, 20b position the rear axles 22, 24 in parallel.

It will be understood that the framework 12 allows for the tandem axle alignment to be accomplished on line during building of the chassis 14 and prior to installation of wheels and tires thereon. Further, this alignment is accomplished while the components are loosely assembled together in a relaxed position thereof. All critical component tightening is accomplished while the chassis 14 is engaged in the framework 12, allowing for the most accurate tandem axle alignment possible with present day soft suspension components to be obtained.

It has been found that the device 10, including the method for its use to be described hereinafter, has significantly reduced warranty costs incurred in connection with tandem alignment and tire wear.

Further, an alignment process that took more than half an hour to perform previously may be simply and more accurately performed in no more than three or four minutes with the device 10. Such time saving is produced by working with axle engaging components which are only loosely engaged, allowing a near instantaneous alignment to be produced upon chassis 14 engagement within the framework 12. Filling of gaps produced by the alignment process with shims is then quickly accomplished. The axle engaging components are then tightened together, while dealing with the axles only rather than with tire or wheel based alignment, which, because of inherent distortion within the wheels or tires, could show misalignment where none in fact exists, when using tire or wheel mounted indicators. Thus such direct axle based alignment, as described herein, significantly increases accuracy.

First, in the chassis building operations performed prior to alignment, axle "U" bolts are left loosely engaged, with the thickness of the nuts thereof being threaded on in a manner to leave one thread showing past the nut, rather than being completely tightened.

Next, again in on-line chassis building, vehicle radius rods are tightened at the frame engaging ends to a predetermined torque. Then transverse torque rods are tightened at both ends, the frame mounted end being tightened first and then the axle mounted end being tightened next, with such tightening also being to a predetermined torque.

The relative positions of the framework towers 20a, 20b, and 15 are then checked to ensure proper empirically predetermined positioning thereof for receipt of a particular chassis 14 thereon.

The chassis 14 is then hoisted to a position over the framework 12, using safety chains during transport. While the chassis 14 is suspended from the hoist, frame-/axle separators (not shown) are installed between the axles 22, 24 and the lateral frame rails 26 thereabove to simulate position of the axles 22, 24 under influence of a functioning soft suspension system (not shown).

The chassis 14 is then lowered onto the framework 12 in a manner to place the rear axles 22 and 24 into their respective pairs of cooperating lateral towers 20a and 20b. Each of the towers 20a, 20b is a telescopic structure having a V shaped seat 28 thereon which is designed and positioned to engage an axle hub 29 therein, with such hub 29 support in effect supporting a rear section 30 of the chassis 14 within the framework 12 via the frame/axle separators engaged between the axles 22, 24 and the chassis 14.

Figure 4:
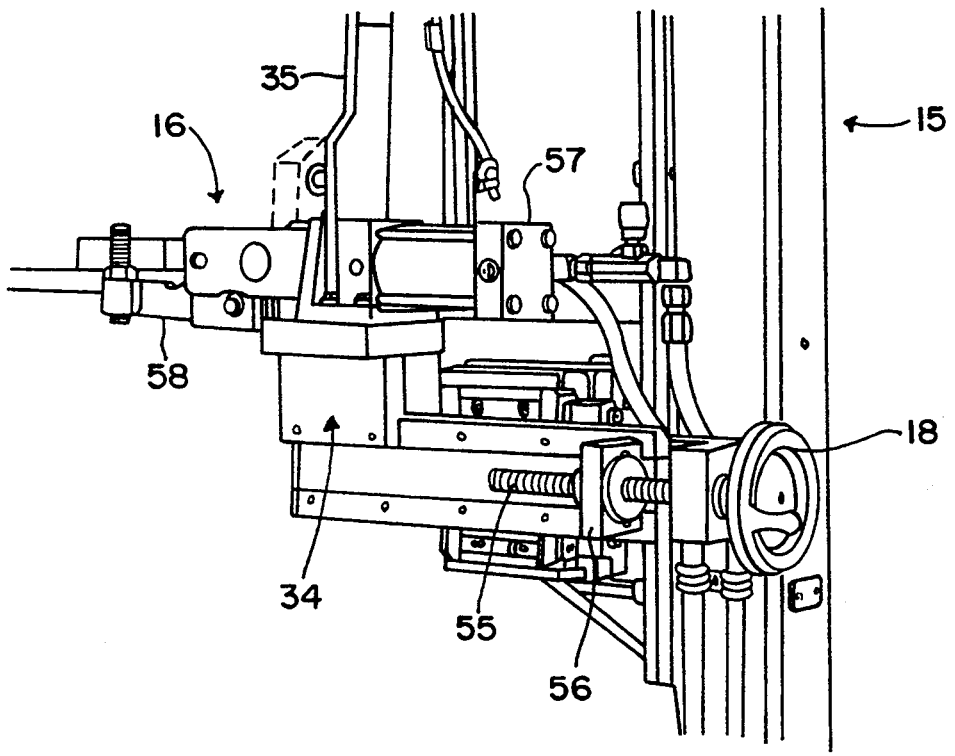
FIG. 4 is an enlarged perspective view of a front end clamping and alignment subassembly of the device.

To support a forward section 32 of the chassis 14, the front end frame towers 15 are provided. The right tower 15 is provided with a clamping assembly 16 thereon which is best illustrated in FIG. 4. The clamping assembly 16 includes a platform 34 which supports thereon a forward end 36 of the corresponding frame rail 26. The clamping assembly 16 includes an air cylinder 57 which when activated, as will be described below, pivots clamp jaw 58 to the closed position shown in phantom lines to clamp the forward end 36 of the right frame rail 26 against the upright rail stop 35, maintaining the frame rail front end 36 level with the rear portion 30 of the chassis 14.

Once the chassis is positioned as described, one of three handles 38, 40 and 42 on an activation assembly 44 is then activated. Such handle 38 activation causes push rods 46 to extend horizontally outwardly from rear frame alignment subassemblies 48 situated to each side of the chassis 14 and mounted on supports 51 adjacent the rear towers 20b. Such rods 46 push the frame rear end into a preselected alignment position when the rods 46 are each fully extended, with the lateral frame rails 26 being gripped therebetween.

Also, upon full extension of the rods 46, a valved hydraulic system (not shown) used to engage the front end clamp assembly 16 and left tower air assist are activated to cause the front end 32 of the chassis 14 to be clamped against rail stop 35 within the framework 12.

Next, as shown in FIGS. 4 and 5, an alignment target 50 is engaged to an outer lateral side 52 of a right frame rail 26 of the chassis 14 as close to a predetermined front axle (not shown) centerline as possible by a magnetic mounting base 53. The target 50 is then leveled vertically by operation of a leveling screw 54 thereof. Once leveled, the target 50 is then centered onto the beam of laser light (not shown) by moving the forward end 32 of the chassis 14 horizontally using the front end clamping assembly 16 adjusting hand wheel 18. The clamping assembly 16 is moved laterally upon turning of the hand wheel 18, the hand wheel 18 turning a screw threaded rod 55 upon which a threaded bracket 56 glides, the bracket 56 being engaged to the clamping assembly 16 while the air assist assembly on the left tower permits and/or assists the frame movement. The front end 32 of the chassis 14 is easily moved laterally on a ball bearing array until the desired target position is reached. Once the laser beam is centered on the target 50, true perpendicularity between the frame rails 26 and the front rear axle 22 is achieved.

Attention is now directed to FIG. 6 and the front rear axle 22 which is seated across towers 20a. It will be understood that the positions of these towers are fixed with the frame rails 26 of the chassis 14 being in true perpendicularity to the axle 22 resting in the towers 20a when the target 50 is aligned with the beam of laser light. "U" bolts 60 of axle 22 are now evenly tightened in a criss-cross manner to a predetermined torque. When the "U" bolts 60 are correctly tightened, spaces at 61 may be created between the radius rod mounts 62 and the axle end castings 64 to which they are engaged. As many shims (not shown) as are necessary to fill the space at 61 are then seated within the spaces at 61. A determination of the number of shims seated within each axle end space at 61 is then made, with an equal number of shims then being removed from each end space until only one end space remains shimmed. Once such alignment is achieved, the radius rod mounts 62 of the radius rods 66 are tightened to the axle castings 64, with perpendicular alignment between the frame rails 26 and axle 22 being easily accomplished.

Then, attention is turned to the rear rear axle 24 which is held parallel to the front rear axle 22 by the towers 20b within which it rests. The shimming procedure is then repeated for this axle 24, as is tightening down of the axle casting end mounts 62 of the radius rod 66. The rear rear axle 24 has now been located nearly perfectly parallel to the front rear axle 22.

Figure 7:
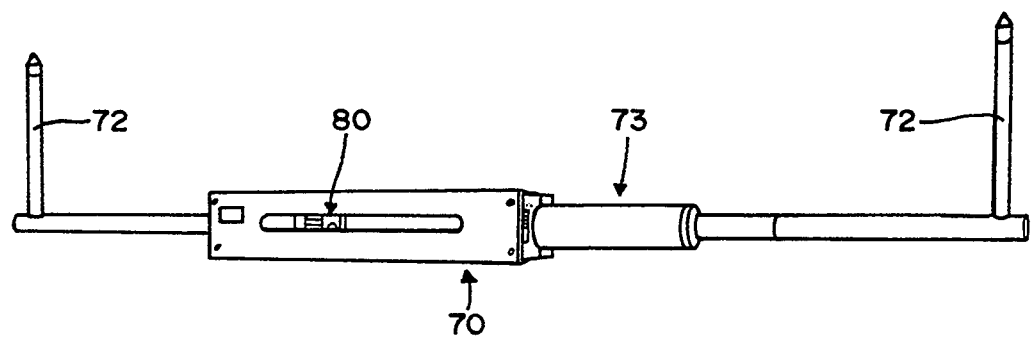
FIG. 7 is a perspective view of a digital vernier tram bar used in determining accuracy of axle positioning.
Figure 8:
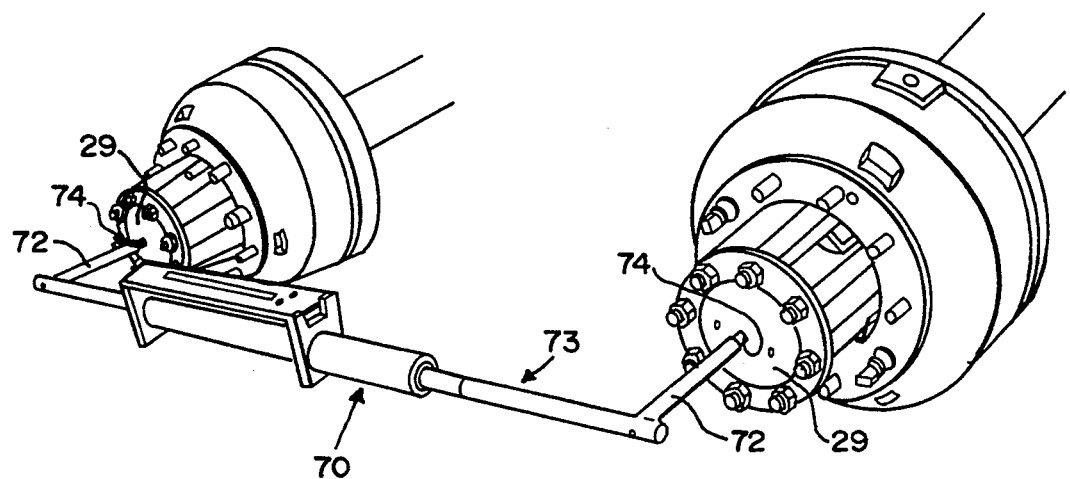
FIG. 8 is a perspective view showing the tram bar engaged to axle centers on one side of the tandem axle assembly of the vehicle.
Figure 9:
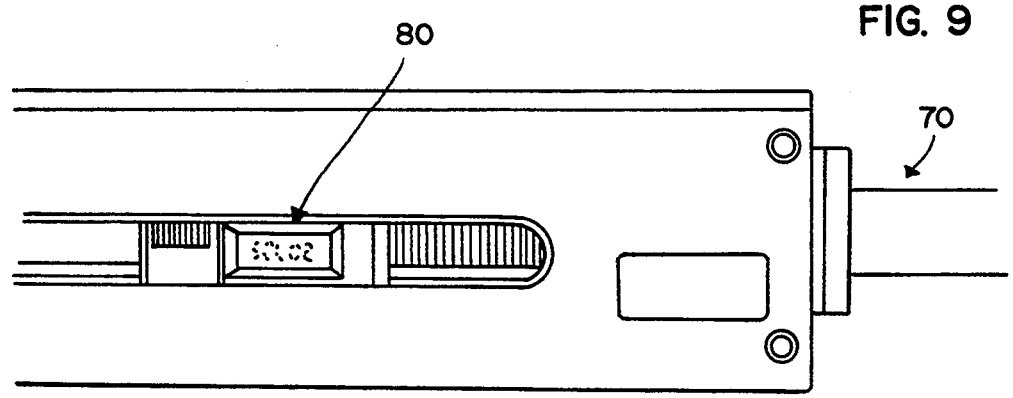
FIG. 9 is an enlarged perspective view of the digital scale provided on the bar.

The alignment subassemblies 48 is then released. After such release, as shown in FIGS. 7–9, a measurement of pitch between tandem axle hub 29 centers is taken on each side of the chassis 14 with a digital vernier tram bar 70. Such tram bar 70, as shown includes a pin 72 at each end of a telescoping bar 73 thereof which engages within a center opening 74 in an outwardly directed surface of each axle hub 29. A comparison is made of the pitch gauge readout produced on a digital scale 80 for each side of the chassis 14, with a discrepancy of no greater than 0.090 inch being acceptable.

If the discrepancy is read to be greater than 0.090 inch, the chassis 14 is marked for manual readjustment, such readjustment primarily involving repositioning of the shims, the human factor causing the error.

The procedure for aligning the tandem rear axles 22, 24 would take over 30 minutes previous to development of the device 10 and method described herein. The total time for alignment using the device 10 and method herein described takes less than five minutes, creating a substantial time and labor savings.

Further, every chassis 14 with tandem axles 22, 24 thereon, passes through this device 10, even those with inflexible suspension systems, such as those referred to as walking beams, which cannot be aligned.

In this case, because the axle suspensions are inflexible, they cannot be allowed to engage within the sensitive towers 20a and 20b used with the soft suspensions. Rather, the operator engages the second valve 40 of the activation assembly 44, causing hydraulic lowering of the towers 20a and 20b to a disengaged position.

Next, the third valve 42 of the activation assembly 44 is activated, causing raising of a centrally disposed chassis support tower 86 to a maximum raised position thereof, the chassis support tower 86 having been in an out of the way position when dealing with the soft suspension chassis.

The device 10 here provides an ease of construction factor rather than an axle alignment.

In this respect, ends of the radius rods 66 and transverse torque rods (not shown) must still be tightened. Typically such tightening was done at a level lower than eye level, making the tightening procedure very difficult.

With the chassis 14 being supported substantially at eye level, tightening of components to critical torque levels is greatly eased, again decreasing the time element for this procedure.

To accommodate the method herein described, as well as to accommodate a variety of chassis 14, various elements of the device 10 must be movable.

For instance, chassis 14 length can vary. To accommodate the variances, the frame rail forward end supports 15 are simultaneously movable toward and away from the axle support towers 20a and 20b.

Likewise, the center-to-center distance between the tandem axles 22, 24 may vary. To accommodate these dimension requirements, the support towers 20b for the rear rear axle 24 are relatively movable toward and away from the support towers 20a for the forward, rear axle 22, as are the supports 51 adjacent thereto.

As described above, the tandem axle alignment device provides a number of advantages, some of which have been described above and others of which are inherent in the invention. Also, modifications may be proposed to the device without departing from the teachings herein. Accordingly, the scope of the invention is only to be limited as necessitated by the accompanying claims.

What is claimed is:

1. In combination with a vehicle chassis having a frame including laterally Spaced frame rails, a device for aligning tandem axles of said vehicle chassis perpendicular to said laterally spaced frame rails and parallel to one another, the device comprising:

a fixed pair of laterally spaced support towers engaging respectively ends of a forward rear axle of the chassis;

a movable second pair of laterally spaced support towers engaging respectively ends of a rear rear axle of the chassis;

a pair of laterally spaced frame rail rear end alignment subassemblies disposed respectively adjacent said second support towers, each subassembly including cooperative means therein for clamping a rear end of said frame between said subassemblies in a predetermined alignment position;

a frame front end support assembly, said front end support assembly having a laterally movable front end clamping means engaging said frame; and indicator means associated with said device for indicating a desired position for the frame relative to one of said axles, said front end clamping means being movable to place the frame in said desired position.

2. The device of claim 1 wherein said indicator means includes a predetermined target mounted to one of said chassis frame rails in a longitudinal position thereon approximating the location of a centerline of a front axle of said vehicle chassis.

3. The device of claim 2 wherein said indicating means further includes a laser beam having a fixed orientation relative to said device, said target being hit by said laser beam upon said frame being in said desired position relative to said one axle.

4. The device of claim 2 wherein said target includes a magnetic mounting base.

5. The device of claim 4 wherein said target is vertically movable relative to said magnetic mounting base thereof.

6. The device of claim 2 wherein said target is provided with means for vertically leveling the target.

7. The device of claim 1 wherein said first and second pairs of support towers include V-shaped axle end seats within which axle ends are supported.

8. The device of claim 7 wherein said second pair of support towers are movable relative to said first pair of support towers to accommodate various center-to-center axle spacings of a variety of tandem axles.

9. The device of claim 8 wherein each said frame rail rear end alignment subassembly is positioned laterally outwardly of an adjacent frame rail.

10. The device of claim 9 wherein each subassembly includes a horizontal rod which extends fully from within the subassembly.

11. The device of claim 10 wherein the rod in each subassembly extends toward the rod in the other subassembly, with the frame being clamped therebetween.

12. The device of claim 10 wherein said clamping means is activated upon full extension of the horizontal rods of said frame rail rear end alignment subassemblies.

13. The device of claim 1 wherein said chassis front end support assembly clamping means engages the front end of one frame rail of said chassis.

14. The device of claim 1 wherein said support towers for said rear rear axle and said support for said frame rail front end are movable toward and away from said fixed pair of forward rear axle support towers.

15. The device of claim 14 wherein said axle support towers are vertically retractable and extendable.

16. The device of claim 15 further including an extendable chassis support tower positioned between the axle support towers and said frame rail front end support.

17. A device for engaging a vehicle chassis, the chassis having mounted thereon a pair of tandem axles to be aligned perpendicular to frame rails of the chassis and parallel to one another, said device creating the alignment and comprising:

first and second spaced apart pairs of spaced apart towers for engaging the tandem axles in a manner to maintain them parallel to one another;

means for fixing the position of a rear end of said chassis; and means for moving the front end of said chassis to a predetermined position relative to the towers to position the chassis perpendicular to the axles.

18. A method of aligning a tandem axle assembly having a front rear axle and a rear rear axle to a vehicle chassis having frame rails comprising the steps of:

loosely assembling said tandem axle assembly to said chassis;

disposing separators between the chassis and each of the axles to approximate the spacing therebetween during normal highway operation of said vehicle chassis;

supporting said front rear axle and said rear rear axle with the axes thereof parallelly disposed respectively on pairs of support towers disposed in predetermined positions;

mounting a rear end of said chassis in a predetermined lateral position relative to said support towers;

mounting a front end of said chassis in a laterally movable clamping device;

attaching a target to said chassis at a longitudinal position thereon corresponding to a predetermined location of an axis of a front axle thereof to be subsequently attached to said chassis;

establishing an indicating means disposed to hit a predetermined point on said target upon said front rear axle being perpendicularly disposed to said frame rails;

moving said front end clamping device to align said indicating means with said predetermined point; and tightening said front rear axle to said chassis.

19. The method of claim 18 wherein said front rear axle is controlled by radius rods mounted between the front rear axle and the frame including inserting shim means in the mounting of the radius rods to the front axle.

20. The method of claim 18 wherein said rear rear axle is controlled by radius rods mounted between the rear rear axle and the frame further comprising the steps of tightening said rear rear axle to said frame and inserting shims in the radius rod mountings as necessary.

21. The method of claim 20 further comprising the steps of releasing the rear end of said chassis, measuring the center-to-center distances between the respective ends of the front rear axle and rear rear axle, and manually readjusting the rear radius rod shims if said center-to-center distances vary by more than a predetermined amount.

* * * * *